United States Patent

Saul

[15] 3,703,671

[45] Nov. 21, 1972

[54] ELECTROLUMINESCENT DEVICE

[72] Inventor: Robert H. Saul, 1 Clinton Lane, Scotch Plains, N.J. 07076

[22] Filed: March 10, 1972

[21] Appl. No.: 233,680

Related U.S. Application Data

[62] Division of Ser. No. 848,546, Aug. 8, 1969.

[52] U.S. Cl. .....317/235 R, 317/235 N, 317/235 AN, 317/235 AQ

[51] Int. Cl. ..............................................H01l 15/00

[58] Field of Search......317/235 N, 235 AQ, 235 AN

[56] References Cited

UNITED STATES PATENTS

| | | | |
|---|---|---|---|
| 3,555,283 | 1/1971 | Grimmeiss | 250/217 |
| 3,365,630 | 1/1968 | Logan | 317/237 |
| 3,592,704 | 7/1971 | Logan | 148/171 |
| 3,470,038 | 9/1969 | Logan | 148/171 |
| 3,462,320 | 8/1969 | Lynch | 148/171 |
| 3,647,579 | 2/1972 | Ladany | 148/171 |
| 3,619,304 | 11/1971 | Narto | 148/171 |

*Primary Examiner*—Martin H. Edlow
*Attorney*—R. J. Guenther

[57] ABSTRACT

The efficiency of gallium phosphide electroluminescent devices, emitting light in the red region of the spectrum, produced by the liquid phase epitaxial deposition of p-type material on an n-type substrate depends in part on the concentration of zinc and oxygen in the gallium solvent used in the deposition and on the heat treatment after deposition. It has been found that inclusion in the gallium of 0.03 mole percent zinc and 0.35 mole percent $Ga_2O_3$ lead to the production of mounted devices of greater than 6 percent photon efficiency when junction formation is followed by a suitable heat treating schedule.

2 Claims, 4 Drawing Figures

ELECTROLUMINESCENT DEVICE

This application is a division of application Ser. No. 848,546, filed Aug. 8, 1969.

BACKGROUND OF THE INVENTION

1. Field of the Invention

This disclosure pertains to the production of gallium phosphide electroluminescent light sources.

2. Description of the Prior Art

Electroluminescent p-n junction devices which emit under forward bias conditions are under active development for a variety of usages as indicator lights and as elements in more complex visual displays. In such devices light is generated during the process of electron-hole recombination.

Materials

Gallium phosphide (GaP) has proven useful as electroluminescent material in the visible region of the spectrum. It belongs to the class of indirect band gap semiconductors which means that the electron-hole recombination requires the presence of a third body such as a dislocation, a vacancy, a substitution or interstitial impurity or some deviation from a perfectly ordered crystal. In GaP devices the third body needed for recombination with the emission of red light is believed to be an impurity complex consisting of an oxygen ion and an acceptor ion (most commonly Zn or Cd) which are present substitutionally in the crystal lattice as a nearest neighbor pair on the p-side of the p-n junction.

Under the influence of an electric field in the forward bias direction an electron is injected from the n-region into the p-region where it is trapped by the complex. Subsequently, a hole is trapped at the same site, recombining with the electron and emitting a photon of red light. If there are no complexes present in the region of injection, the electron will, in time, recombine by one of a number of other processes which do not involve the emission of visible light. Thus, an efficient (GaP electroluminescent device requires both the efficient injection of electrons into the p-region and the presence, in the region of injection, of a sufficient concentration of oxygen-acceptor complexes.

GaP is a III–V compound semiconductor whose constituents belong to column three and five of the periodic table of the elements. The donor (n-type) dopants are usually selected from column six and are included in the crystal lattice in a minus 2 ionic state and the acceptor dopants are usually selected from column two and are included in the crystal lattice in the plus 2 ionic state. However, the amphoteric dopants from column four are sometimes used, their valence state being determined by the particular substitutional site occupied. The most widely used donor dopants are sulphur (S), selenium (Se) and telurium (Te) while the most widely used acceptor dopants are zinc (Zn) and cadmium (Cd). The amphoteric dopants Si and Sn have recently attracted some interest.

Growth Techniques

A number of different techniques have been employed in the fabrication of GaP electroluminescent devices. The techniques most pertinent to this disclosure involve the epitaxial deposition of material of one conductivity type from a liquid Ga solution upon a substrate of the other conductivity type. A p-n junction, so produced is known as epitaxially grown junction. Substrates have been produced by techniques such as the Czochrollski technique (crystal pulling from a GaP melt), solution growth (the slow cooling of a solution of GaP and suitable dopants in molten gallium), vapor phase epitaxy (the epitaxial deposition of GaP and suitable dopants from a carrier gas onto a GaAs substrate, which is subsequently ground off) and liquid phase epitaxy (LPE) (to be described below.).

In an exemplary form of the LPE process as applied to GaP (Lorenz and Pilkuhm, Jour Appl Phys, 37 (1966) 4094) a suitable substrate is held at the upper end of a tube. In the lower end are placed carefully measured quantities of gallium (as the solvent), the required GaP and the desired dopants (as solutes). The temperature of the tube is raised to between 1,000°C and 1,200°C where the constituents dissolve in the molten gallium. The tube is then rotated or tipped so that the molten mass flows over the substrate and the temperature is lowered at a controlled rate. As the temperature of the molten mass decreases, the dissolved material goes out of solution and is deposited on the substrate as an epitaxial crystal. This process has been referred to as "tipping."

Doping Levels

Such electroluminescent devices form an active field of research, much of this research going into an effort to optimize the concentrations of the various dopants on the p and n sides of the p-n junction. In an attempt to simplify the experimental conditions and optimize the Zn and O concentrations in the p-type material without the presence of the n-type layer, photoluminescent measurements were performed in which electrons were "injected" into the conduction band through excitation by high energy light (Gershenzon et al., Jour of Appl Phys, 37 (1966) 483). These experiments showed, for solution grown material, the optimum concentration of Zn in the gallium solution to be in the range 0.1 mole percent to 11 mole percent relative to the gallium solvent (see above reference FIG. 2), and the optimum concentration of $Ga_2O_3$ (as the source of 0 doping) to be in the range of 0.003 mole percent to 0.1 mole percent (see above reference page 1,533). Later work by other investigators was strongly influenced by these findings taking these as the optimum concentration ranges. Some of this subsequent work involved the LPE process (Lorenz and Pilkuhn, Jour Appl Phys, 37 (1966) 4094; Logan et al., Appl Phys Lett, 10 (1967) 206; Shih et al. Jour Appl Phys, 39 (1968) 2747; Allen et al., Jour Appl Phys, 39 (1968) 2977;Ladany, Jour Electrochem. Soc, 116 (1969) 993).

The optimum donor conentration on the n side of the junction is influenced by the following two factors. As large an electron density as possible is desired for efficient electron injection from the n-side to the p-side. However, if the electron concentration is too high the n-type material becomes absorptive of the generated light. This absorption is important since a large proportion of the generated light is internally reflected at the surface of the device and traverses the device several times before emerging. It has been found that the optimum donor concentration lies in the range of $0.3 \times 10^{18}$ to $1.0 \times 10^{18}$ per cubic centimeter in the n-type material (Kressel et al. Solid State Elect, 11 (1968) 467). This work was done using tellurium as a donor.

However, sulphur and selenium have been shown to be essentially equivalent as donor dopants.

Heat Treatment

The heat treatment of devices of this class after junction formation has been shown to be beneficial. The amount of benefit derived, however, has varied considerably. Logan et al. (Appl Phys Lett, 10 (1967) 206), who investigated devices made by LPE of Te doped n-type material on Zn and O doped p-type substrates, heat treated their devices at temperatures between 450°C and 725° C for times greater than 16 hours. They report increases of as much as an order of magnitude in the efficiency of their devices. Their maximum efficiencies were between 1 percent and 2 percent. Shih et al. (Jour Appl Phys, 39 (1968) 2747) and Allen et al. (Jour Appl Phys, 39 (1968) 2977) investigating devices made by the LPE of Zn and O doped p-type material on the doped n-type substrates realized improvements of, at most, a factor of two reaching efficiencies of at most 1 percent.

SUMMARY OF THE INVENTION

The inventive matter disclosed here pertains to a process for the process for the production of diodes with efficiencies in the 4 percent to 7 percent range. This breakthrough could significantly influence the solid state visual display industry. It has been found that such efficiencies can be realized by departing from the heretofore accepted optimum concentration ranges in the direction of lower Zn and higher 0 (in the form of $Ga_2O_3$ in the LPE solution). These devices are made by the LPE of a Zn and O doped p-type GaP layer on a n-type substrate where the gallium solvent contains Zn in the concentration range 0.02 mole percent to 0.06 mole percent relative to the gallium and $Ga_2O_3$ in the concentration range 0.25 mole percent to 1 mole percent for an LPE process starting at 1,060°C. The above efficiencies are realized when the donor concentration in the n-type substrate falls within the prior art optimum range and the resulting device is heat treated at temperatures within the range of 450°C to 800°C for times between 3 hours and 60 hours.

The above exemplary processes have produced devices containing $1 \times 10^{17}$ to $5 \times 10^{17}$ per cubic centimeter of O donors and $3 \times 10^{17}$ to $1 \times 10^{18}$ per cubic centimeter of Zn acceptors within the first 10 microns of the p-side of the p-n junction and $0.3 \times 10^{18}$ to $2 \times 10^{18}$ per cubic centimeter of Te within the first 10 microns of the n-side of the p-n junction. These regions are the critical regions for the light production and it is clear that the teaching of this disclosure extends, beyond the current processes used to realize these preferred concentrations, to any process by which these concentrations can be produced.

In addition to the aforementioned dopants, it may be necessary to add other donor or acceptor dopants to modify bulk semiconducting properties of the device such as resistivity. Another class of possible inclusions are isoelectronic materials such as GaAs which act as neither acceptors nor donors but act to change the semiconducting band gaps and may influence such properties as the wavelength of the emitted light. GaP-GaAs mixed crystals (until the composition 40% GaP - 60% GaAs) are indirect band gap semiconductors maintaining a GaP like character. It is intended to include devices with such additional dopants within the teaching of this disclosure.

Definition

Efficiency — when used in this disclosure efficiency is to be taken to means the ratio between the number of photons of light emitted from the device and the total number of charge carriers (electrons plus holes) passing through the devices across the light emitting p-n junction. This is sometimes referred to as the "external quantum efficiency" of the device and is greater than the true energy efficiency by approximately the ratio between the band gap energy and energy of the photon. For devices such as those disclosed here the quantum efficiency is of the order of 20 percent higher than the true energy efficiency.

DETAILED DESCRIPTION OF THE INVENTION

The Inventive Process

During experiments into the production of GaP electroluminescent devices by the LPE of a p-type layer on an n-type substrate it was decided to venture beyond the limits of $Ga_2O_3$ doping which had theretofore been considered optimum. Indeed the upper end of this range had been shown to correspond to the maximum equilibrium solubility at the LPE growth temperature (Foster et al. Jour Electrochem Soc 116 (1969) 494). Using a 0.16 mole percent Zn doping (within the prior art range) it was found that, for an LPE process starting at 1,060°C, device efficiency increased monotonically with $Ga_2O_3$ doping (see FIG. 1) until the neighborhood of 1 mole percent beyond which sufficiently perfect epitaxial layers were not obtainable in the apparatus used. The upper limit, thus, does not represent an optimum but merely a practical limit imposed by the apparatus. Choosing a concentration of 0.35 mole percent $Ga_2O_3$ (well within the newly found desirable range) further experiment showed remarkable results. Devices made using different Zn dopings showed a broad efficiency maximum below 0.1 mole percent Zn (see FIG. 2, curve 1) before heat treatment. The heat treatment of devices using the prior art Zn doping yielded modest efficiency improvement. However, the efficiency improvement afforded by heat treatment increased dramatically as the Zn doping was decreased reaching a peak of a factor greater than 4 at 0.03 mole percent (see FIG. 2, curve 2.)

Figure 1:
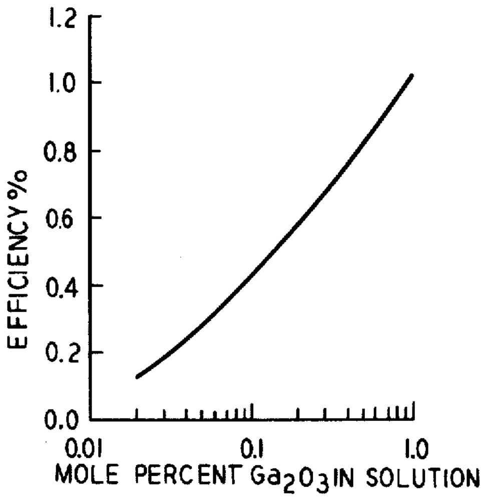
FIG. 1 is a curve showing the efficiency (vertical axis) of GaP electroluminescent devices formed by the LPE deposition of a p-type layer on an n-type substrate, as a function of the amount of $Ga_2O_3$ in the solution (horizontal axis). The amount of Zn is held fixed at 0.16 mole percent of the solvent.
Figure 2:
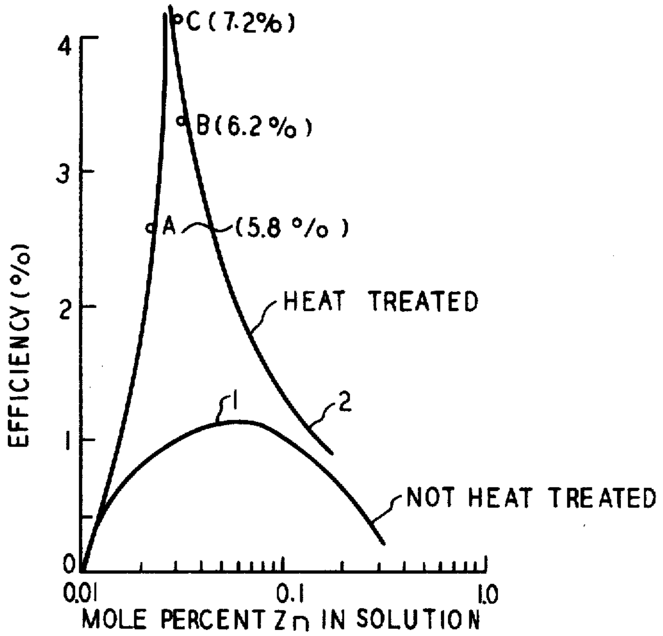
FIG. 2 is a set of two curves showing the efficiency (vertical axis) of GaP electroluminescent devices formed as above, as a function of the amount of Zn in the solution (horizontal axis) for heat treated and unheat treated devices. The amount of $Ga_2O_3$ is held fixed at 0.35 mole percent of the solvent.

The measurements indicated in FIGS. 1 and 2 were made on devices in a test jig with simple pressure contacts. After heat treatment the peak efficiency was greater than any previously reported GaP device. When these devices were provided with ohmic contacts by the usual gold alloy bonding techniques and encapsulated, as is common practice, in a dome of transparent high index of refraction (1.6) material, the maximum observed efficiency rose to 7.2 percent. Alloy bonding reduces resistive losses and the high index dome reduces the effects of total internal reflection. The efficiencies of representative encapsulated devices over the Zn doping range are indicated in parenthesis in FIG. 2.

The LPE process described above as a preferred embodiment of the invention started from a temperature of 1,060°C. This process, however, can be initiated over a wide range of temperature limited, at the low end, by the solubility of the various solutes and, at the high end, by the vapor pressure of phosphorus (35 atmospheres at the melting point of GaP −1,700°). The temperature interval 1000° C to 1200° C represents a workable range over which experiments have been performed. Operation at the temperatures higher than 1,060°C should lead to the solution of more of the $Ga_2O_3$ and should permit reliable crystal growth to the order of 2 mole percent $Ga_2O_3$. The distribution coefficient at Zn at these higher temperatures favors inclusion of more Zn in the solid extending the preferred Zn concentration range down to 0.01 mole percent depending on the initial temperature.

Heat Treatment

Logan et al. in their investigations of LPE n on p devices found that these devices benefited from heat treatment in the temperature range 400°C to 725°C for 16 hours or longer. The experiments referred to in this disclosure for LPE p-n devices agree in major part with these findings, but an attempt was made to establish more restricted preferred ranges. The knowledge of such restricted ranges is beneficial since the use of excessively high temperatures leads to an increased danger of contamination and the use of excessively low temperatures requires inordinately long treatment times. It was found to be unnecessary to heat treat at temperatures above 600°C and it was found that heat treatment at 500°C required longer than 18 hours (overnight), but less than 60 hours (over a weekend) to achieve best results.

A preferred schedule was developed which minimized both time and temperature of the treatment. This schedule consists of treatment at 600° C for five hours followed by a treatment at 500°C for 18 hours. These particular times were chosen to fit conveniently within a 24 hours day. It is clear that they do not represent an optimum but merely indicate the desirability of a heat treatment with an initial period above 550°C and a terminal period below 550°C (the temperature need not be constant during these periods). These results probably indicate the presence of at least two types of diffusion processes (e.g. annealing of defects and formation of Zn-O nearest neighbor complexes) during the heat treatment one having the higher threshold energy than the other.

Concentration Profiles

The concentrations of the various dopants in the finished devices has been determined from a series of capacitance measurements made on angle-lapped devices. In order to perform such a measurement, the device in the region of the junction is lapped at a small angle to the plane of the p-n junction. An array of gold dots is then deposited on the lapped face forming an array of metal-semiconductor diodes. The net dopant concentration as a function of position in the device, the concentration profile, can be derived from a-c and d-c capacitance measurements of the diodes (J.A. Copeland TRANS IEEE, ED-16 (1969), 445).

If a region of the device contains only one active dopant (i.e., donor or acceptor) then the above measurement will give the concentration of that dopant directly. If a region contains more than one active dopant a series of measurements on different devices will be necessary. For instance, if the n-type region is doped with only Te (a donor) capacitance measurements will give the Te concentration profile directly. However, if the p-type region of the operative device is doped with ZN and O measurements on two devices will be needed. First, and inoperative device is formed as is the operative device but with the ommission of the $Ga_2O_3$ doping. From this the Zn (an acceptor) concentration profile is derived (by the above capacitance measurements on an angle lapped device). The operative device is then examined. Since O is a donor, compensation will take place and the net acceptor concentration in the p-type region of the operative device will be less than the Zn concentration in the p-type region of the inoperative device. The difference between these concentrations is the O donor concentration. The above measurement technique is best known at the present time but, clearly not the only possible technique.

Figure 3:
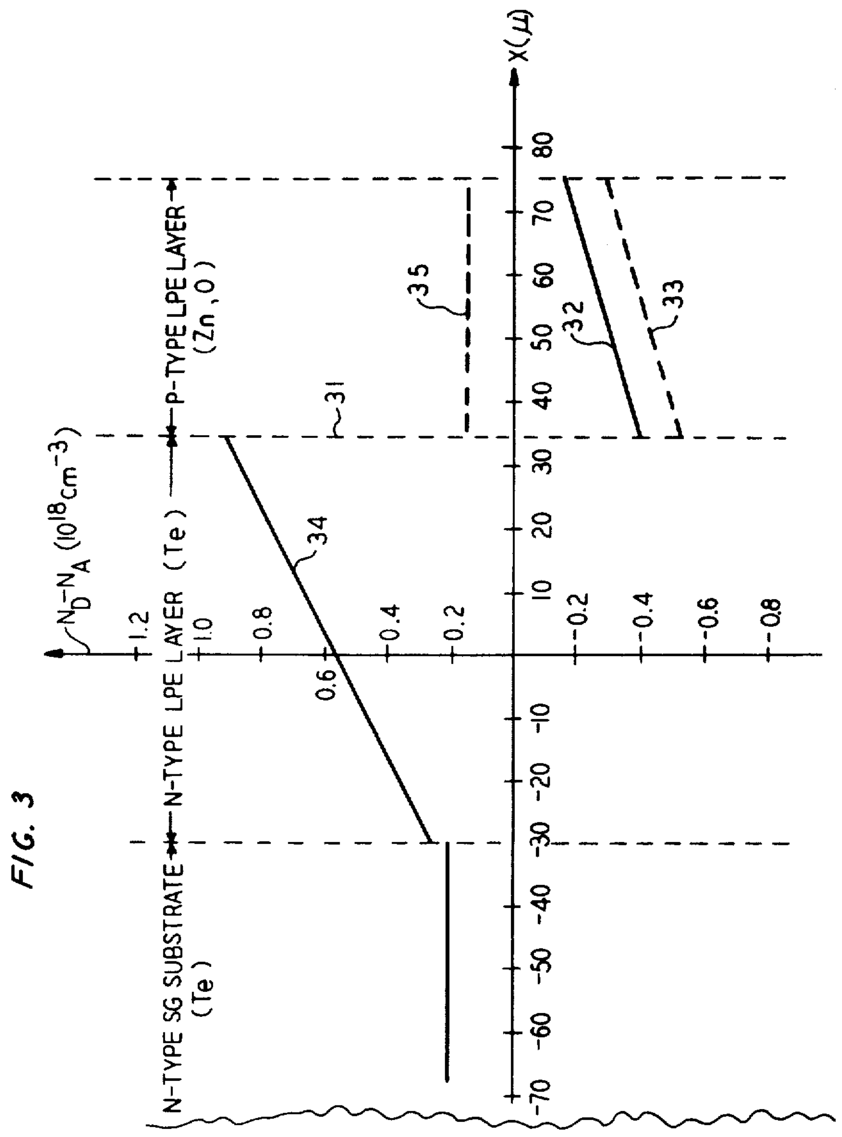
FIG. 3 is a curve showing the concentration of the various dopants in a representative high efficiency device as a function of position in the device, forming a concentration profile. Donor concentrations are shown above the horizontal axis and acceptor concentrations are shown below the horizontal axis.

FIG. 3 shows the concentration profile of a typical high efficiency device. This device was formed by the LPE deposition of a p-type layer of Zn and O doped GaP onto a composite substrate formed by the LPE deposition of an n-type layer of Te doped GaP on an n-type solution grown substrate lightly doped with Te. The Te concentration in the n-type LPE layer 34 increases to $0.9 \times 10^{18}$ per cubic centimeter at the junction while the net acceptor concentration 32 is $0.42 \times 10^{18}$ per cubic centimeter starts at $0.4 \times 10^{18}$ per cubic centimeter. Measurement of a device made with no O doping showed a Zn concentration 33 starting at $0.58 \times 10^{18}$ per cubic centimeter implying that the operative device has an O donor concentration of $1.6 \times 10^{18}$ per cubic centimeter. Since the lengths characteristic of the electron and hole transport processes are of the order of 1 to 4 microns in GaP, the material within 10 microns of the n-side of the p-n junction 31 supplies most of the injected electrons and most of the light is produced within 10 microns of the p-side of the p-n junction 31. Thus, the doping concentration of primary importance are those within 10 microns of each side of the junction 31. FIG. 3 shows that an exemplary high efficiency device has, in region of the p-n junction, a Te concentration in the n-type material of $0.9 \times 10^{18}$ per cubic centimeter, a Zn concentration in the p-type material of $5.5 \times 10^{17} \times 10^{17}$ per cubic centimeter and a concentration of O in the p-type material of $1.5 \times 10^{17}$ per cubic centimeter.

The doping concentrations away from the junction effect the device efficiency in a secondary way. Since the light produced near the junction must pass through this material in order to emerge from the device (indeed, internal reflection may cause some of the light to traverse the device several times before emerging) efficiency will be adversely effected if the material away from the junction is absorptive of the light. Free carriers absorb red light so that it is desirable to produce a device in which the concentration of dopants decreases away from the junction. From this point of view it is believed that an efficient device would have, as the composite n-type substrate, a thin layer (perhaps 10 microns) of heavily Te doped GaP (perhaps $2 \times 10^{18}$ per cubic centimeters) deposited on a lightly doped substrate and a p-type region doped with as much Zn and O as possible, consistant with a close compensation of the Zn by the O. This would provide, in the region of the junction 31, a large concentration of electrons on the n side relative to holes on the p side for efficient injection and a large concentration of Zn-O pairs for efficient light emission. Away from the junction, the free carrier concentration is low, thus the light absorption would be small.

Exemplary Procedure

Figure 4:
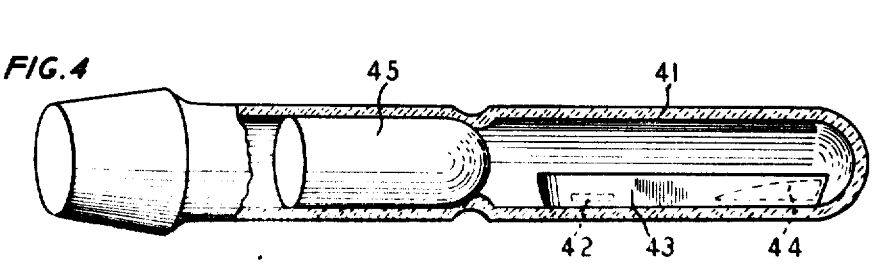
FIG. 4 is a perspective view partly in section of a capsule used for the LPE deposition process.

Following is a procedure which is exemplary of those which can be used to produce the electroluminescent device referred to in this disclosure. The procedure can be referred to, briefly, as a p-n double tipping done in a sealed fused silica capsule on a solution grown substrate and incorporating an in situ heat treatment. The capsule used is shown in FIG. 4. A fused silica tube 41 is provided with a sealing plug 45 and holds a fused silica boat 43. The capsule 41, held at an angle, and the substrate 42 is placed in the upper end of the boat. The lower end of the boat 43 contains the mass 44 of the solvent gallium, GaP and the appropriate dopants.

For the first deposition (or tipping) the substrate is a lightly Te doped solution grown GaP substrate which has been ground and polished on the phosphorus-(111) face. After suitable cleaning procedures, 0.015 mole percent Te and 6.5 mole percent GaP are added to 6 grams of Ga to form the LPE solution. Epitaxy then is produced under a forming gas atmosphere starting at 1,060°C by tipping and cooling, the forming gas being necessary to reduce transport of the substrate via gaseous GaTe. After the completion of the deposition, the crystal is recovered by digesting the Ga in warm nitric acid. The resulting composite substrate is then polished for use in the p-tipping.

For the deposition of the p-type layer a 6 gram Ga charge is doped with 6.5 mole percent GaP, 0.03 mole percent Zn and 0.35 mole percent $Ga_2O_3$. The capsule is evacuated and epitaxy proceeds as above. Heat treatment can take place in situ by arresting the cooling cycle for 5 hours at 600°C and 18 hours (overnight) at 500°C. The most efficient devices have been produced using this in situ heat treatment but other measurements indicate that heat treatment after recovery of the crystal is also effective.

After recovery of the crystal by digestion, mesa diodes of approximately $7 \times 10^{-4}$ cm$^2$ junction area are fabricated and mounted on a gold plated TO18 diode mount using a pressure contact. This is used as a test jig. Representative diodes are mounted permanently by bounding Au-Zn wires to the p-type layers and Au-Sn wires to the n-type layers. The bonded diodes are then encapsulated in a dome of high index of refraction (1.6) transparent epoxy to reduce the effects of total internal reflection.

Comments on the Scope of the Invention

Much of the above material has been illustrative and included only to add to the clarity of the teaching. Many variations in the materials used, the deposition techniques and the device fabrication techniques leave the basic dopant concentration dependence of the device efficiency unaffected. The substrate may be doped with donors other than Te and may be produced on any of the other processes known in the art. The utility of other acceptor dopants in the deposited layer has been disclosed earlier, but in addition, $Ga_2O_3$ is only one of the several possible sources of O doping. Among the others is ZnO.

The details of the LPE process are subject to much variation. As an alternative to "tipping" such processes as the mechanical lowering of the substrate into the solution (dipping) are under investigation. The sealed capsule arrangement has been included in this disclosure as a preferred embodiment since it is considered to lead to a more controllable and reproducable process than the open tube arrangement in which an inert or reducing gas passes through the deposition capsule. In the open tube arrangement, however, consideration must be given to the possible loss of dopants into the gas stream during the deposition cycle. Such variations of the LPE process do not avoid the utilization of the teaching of this disclosure.

The devices described in the exemplary experimental procedure were mesa diodes. However, the processing of the finished wafer by processes such as "scribing and cracking" leave the basic production of light uneffected. Either before or after the production of the light producing p-n junction disclosed here, other rectifying junctions or other of the many forms of electrical contact known in the art may be introduced in order to form a multicontact device whose light-producing junction is still taught here.

What is claimed is:

1. An electroluminescent device composed principally of GaP containing at least one p-n junction characterized in that the material within the first 10 microns of the p side of the said p-n junction contains at least an average concentration of between $1 \times 10^{17}$ per cubic centimeter and $9 \times 10^{17}$ per cubic centimeter of O donors and a concentration of between $2 \times 10^{17}$ per cubic centimeter and $1 \times 10^{18}$ per cubic centimeter of an acceptor selected from the group Zn and Cd.

2. A device of claim 1 in which the material within the first 10 microns of the n side of the said p-n junction contains at least one of the elements S, Se, Si, Sn and Te as the major dopant in an average concentration within the range $0.3 \times 10^{18}$ per cubic centimeter to $2 \times 10^{18}$ per cubic centimeter.

* * * * *